(12) United States Patent
De Moerloose et al.

(10) Patent No.: US 6,608,556 B2
(45) Date of Patent: Aug. 19, 2003

(54) METHOD AND APPARATUS FOR PROVIDING A USER OF A MOBILE COMMUNICATION TERMINAL OR A GROUP OF USERS WITH AN INFORMATION MESSAGE WITH AN ADAPTIVE CONTENT

(75) Inventors: Jan De Moerloose, Lovendegem (BE); Marc Godon, Londerzeel (BE); Luk Overmeire, Aalter (BE); Frans Westerhuis, Antwerp (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/975,962

(22) Filed: Oct. 15, 2001

(65) Prior Publication Data

US 2002/0050927 A1 May 2, 2002

(30) Foreign Application Priority Data

Oct. 16, 2000  (EP) ............................................ 00440277

(51) Int. Cl.$^7$ .............................................. G08B 23/00
(52) U.S. Cl. ...................... 340/501; 340/539; 340/905; 340/995; 455/56.1; 701/208; 701/211
(58) Field of Search ................................ 340/501, 901, 340/905, 915, 996, 988, 539; 455/33.1, 56.1, 89; 701/208, 211, 207

(56) References Cited

U.S. PATENT DOCUMENTS

| | | | | |
|---|---|---|---|---|
| 4,602,129 A | * | 7/1986 | Matthews et al. | 379/88.26 |
| 4,866,770 A | * | 9/1989 | Seth-Smith et al. | 380/212 |
| 5,204,874 A | * | 4/1993 | Falconer et al. | 375/130 |
| 5,235,415 A | * | 8/1993 | Bonicel et al. | 725/137 |
| 5,263,129 A | * | 11/1993 | Ikegaya et al. | 345/418 |
| 5,280,610 A | * | 1/1994 | Travis et al. | 707/103 R |
| 5,369,702 A | * | 11/1994 | Shanton | 713/166 |
| 5,629,688 A | * | 5/1997 | Muramatsu et al. | 340/7.47 |
| 5,771,238 A | * | 6/1998 | Sutton | 370/474 |
| 6,006,084 A | * | 12/1999 | Miller et al. | 455/406 |
| 6,014,090 A | | 1/2000 | Rosen et al. | 340/905 |

FOREIGN PATENT DOCUMENTS

| | | |
|---|---|---|
| GB | 2 326 053 A | 12/1998 |
| WO | WO 98/08314 A1 | 2/1998 |
| WO | WO 98/08314 | 2/1998 |
| WO | WO 00/22860 | 4/2000 |
| WO | WO 00/22860 A1 | 4/2000 |

* cited by examiner

Primary Examiner—Daryl Pope
(74) Attorney, Agent, or Firm—Sughrue Mion, PLLC

(57) ABSTRACT

The invention relates to a method and an apparatus (5) for providing a user of a mobile communication terminal (4) or a group of users with a time-dependent information message. The location of the mobile communication terminal (4) is determined. A user profile (6) of the user or the group of users is determined. A content of the information message is generated according to the determined user profile (6) and according to the current time. The information message is provided to the user or the group of users. In order to provide a user or a group of users with highly relevant information, i.e. with up-to-date information concerning the user's interests and depending on his location, it is suggested that

- an electronic display (3) and/or (8) for providing the information message to the user or the group of users is selected according to the determined location of the user or the group of users and the location of the electronic display (3, 8); and
- the information message is displayed automatically to the user or the group of users by means of the electronic display (3, 8) selected, whereas
- the user profile (6) and/or the location of the mobile communication terminal (4) is determined by means of a terminal identifier associated to the mobile communication terminal (4).

19 Claims, 3 Drawing Sheets

METHOD AND APPARATUS FOR PROVIDING A USER OF A MOBILE COMMUNICATION TERMINAL OR A GROUP OF USERS WITH AN INFORMATION MESSAGE WITH AN ADAPTIVE CONTENT

BACKGROUND OF THE INVENTION

The present invention relates generally to telecommunications. More specifically, the present invention relates to a method and an apparatus for providing a user of a mobile communication terminal or a group of users with a time-dependent information message.

The method comprises the steps of:
a) determining the location of the mobile communication terminal;
b) determining a user profile of the user or the group of users;
c) generating a content of the information message according to the determined user profile and according to the current time; and
d) providing the information message to the user or the group of users, for providing a user of a mobile communication terminal or a group of users with geographically localized information message.

The apparatus comprises:
a) means for determining the location of the mobile communication terminal;
b) means for determining a user profile of the user or the group of users;
c) means for generating a content of the information message according to the determined user profile and according to the current time; and
d) means for providing the information message to the user or the group of users.

The invention is based on a priority application EP 00 44 0277 which is hereby incorporated by reference.

SUMMARY OF THE INVENTION

A method and an apparatus of the above mentioned kind is known from Rosen et al., U.S. Pat. No. 6,014,090, filed on Dec. 22, 1997. This document discloses a way of providing a user of a mobile communication terminal with dynamic information. The information is transmitted to the mobile communication terminal upon request, i.e. the information is "pulled" by the user, and has an audio content. The information provided is relevant to the geographical location of the mobile communication terminal or the user respectively. The information is transmitted to the user only upon his request. The user may control the level of detail of the provided dynamic information to match his needs and interests. The information is time-dependent, i.e. the information is up-to-date.

The location of the mobile communication terminal is determined by means of a Global Positioning System (GPS) or a bar code scanner, which reads bar coding signs (e.g. highway signs including a bar code indicating the geographic location of that particular sign) fixedly located external from the mobile communication terminal. Alternatively, the user associated with the mobile communication terminal can provide the geographic location information. The geographic location information is transmitted over a wireless link to a server making part of a telecommunications network.

Additional information other than the geographic location information may be transmitted to the server with the geographic location information. For example, a request for a specific type of information (e.g. a request for a particular facility or service) or a user identifier may be transmitted over the wireless link in the case where the user has predefined a profile comprising preferred facilities and services. Such a user profile can be stored in a memory of the server.

A multiplicity of addresses is selected in the server according to the location of the mobile communication terminal and according to the user profile stored in the memory of the server. The addresses selected are transmitted to the mobile communication terminal. The user selects a desired address, the mobile communication terminal is connected to a server associated with the address selected and the dynamic information is provided to the user via a user interface device of the mobile communication terminal.

This method know from the U.S. Pat. No. 6,014,090 may be useful to provide a traveler with travelling information about the local area corresponding to the traveler's location. In contrast to conventional travel books or travel agents, which can only provide relatively static (out of date) information, this known method can provide up-to-date information. The whole method is aimed at information services, whose main issue is to let the user choose whether he wants to be provided with information or not, and which information he wants to be provided with.

The method known from the U.S. Pat. No. 6,014,090 certainly is not suitable for advertisement services, whose main issue is to provide a user with increasingly relevant information. The relevance of information depends on the time (up-to-date information is more relevant than out-of-date information), on the location of the user (a user in a certain location may be interested in certain products or services which would not be of interest to him in other locations) and on the user's interests (some users are interested in certain products or services which are of no interest to other users). To increase the effect of advertisement on users it is mandatory that the users cannot influence the time of presentation and the content of the advertisement.

It is an object of the present invention to provide a user or a group of users with highly relevant information, i.e. with up-to-date information concerning the user's interests and depending on his location.

For a method as described above, according to the present invention this object is solved by a method further comprising the steps of:
e) selecting an electronic display for providing the information message to the user or the group of users according to the determined location of the user or the group of users; and
f) automatically displaying the information message to the user or the group of users by means of the electronic display selected, whereas
g) the user profile is determined by means of a terminal identifier associated to the mobile communication terminal and/or the location of the mobile communication terminal is determined by means of a location identifier received from the mobile communication terminal.

If the electronic display is mobile (e.g. mounted on a zeppelin or on a public transport vehicle) the electronic display is additionally selected according to the location of the electronic display.

The mobile communication terminal may be a pager of some kind or a mobile phone, particularly a cellular mobile phone according to the Global System for Mobile Communications (GSM)-standard, to the Universal Mobile Telecommunications System (UMTS)-standard or to some other standard. The terminal identifier and/or the location identifier is received from the mobile communication terminal via a telecommunication network. The terminal identifier comprises information about the specific terminal and the location identifier comprises information about the location of the terminal. This information is used for determining the user's interests stored in the user profile and/or the location of the mobile communication terminal.

The method according to the present invention provides a possibility to provide a user with highly relevant information, i.e. with up-to-date information concerning the user's interests and depending on his location. More specifically the present invention provides a possibility to provide a user or a group of users with on-time personalized advertisement. By means of the present invention, advertisement or personal service offers can be provided with the right content, on the right time, on the right place, for the right duration to the right people. The information is "pushed" to the user or the group of users. The users cannot influence the time of presentation, the content of the information and the place of presentation.

The invention may be realized as part of a Value Creation Environment (VCE). VCE is an environment wherein certain techniques, technologies and services are brought together in order to create a new service with more or added value to the various participants of the VCE. The participants are, for example, a user of the mobile communication terminal or a group of users, an Individual Electronic Advertising service provider (IEA service provider), an advertiser, an owner of the VCE platform, an operator of a telecommunication network, in which the mobile communication terminal is integrated, and an owner of an electronic billboard or bulletin board.

A VCE subscription gives each actor access to value added services which allows integration of various services on the same platform. The various participants of the VCE have different types of subscriptions. The user has a subscription for accessing services. The IAE service provider has a subscription for deploying his service on the platform and/or a subscription for other services he is allowed to collaborate with.

The location of the mobile communication terminal is stored in a terminal profile which is stored on a server of the platform. A user profile comprising the user's preferred interests is stored on the server of the platform, too. The terminal profile is linked with the user profile of the subscribed user. The operator of the telecommunication network, who is also subscribed to the VCE, will take the necessary steps to update the location information in the terminal profile whenever the mobile communication terminal changes its location. The resolution and the accuracy of the location coordinates is part of the telecommunication network operator's contribution to the VCE.

The IEA service provider uses the subscribed user's terminal profile to determine the location of the mobile telecommunication terminal or the user respectively. By subscribing to the IEA service, the user allows the IEA service provider to access the terminal location information in his terminal profile and to access his preferred interests stored in the user profile. The IEA service provider pushes the advertisement, offered by the subscribed advertiser, to the electronic display selected. This may be a public electronic display such as, for example, an electronic billboard or bulletin board disposed at some publicly accessible location. The owner of the electronic billboard or bulletin board is subscribed to VCE, too, in order to make his electronic board part of the selectable electronic displays. The information may as well be displayed on a private electronic display such as for example on a display of the mobile communication terminal, on a display of other mobile communication terminals or on a display of a mobile computer. The electronic display may also be some kind of a public shared media, e.g. a public video screen at a railway station or the like. Besides advertisement, the information message displayed on the electronic display could also be some kind of emergency message.

The advertiser subscribed to the IEA service may select the electronic display according to the minimum physical distance (radius) between the IEA subscribed user's terminal and the electronic display on which the advertisement is to be published before the advertisement is published. The content of the information message, i.e. the advertisement, may be generated according to the minimum number of correspondences between target categories associated to the content of information messages and user categories associated to the user's interests stored in the user profile. Furthermore, the content of the information message is adapted to the type of electronic display (constraints or capabilities) selected for displaying the information message and to the user profile by the IEA service.

The profiles of the various electronic displays (e.g. electronic billboard or bulletin board) are entered in the VCE system by the owner of the electronic displays. The operator of the telecommunication network enters the network profiles and the policies of payment for using his network during his VCE subscription.

In an advantageous embodiment of the present invention the content of the information message is generated according to the location of the mobile communication terminal. The message content of the information is not necessarily relevant to the geographical position of the user or the mobile communication terminal respectively. For example an advertisement about swimming suits is relevant to the summer season (time dependent). Advertising on a certain electronic bulletin board is relevant to the fact that users are detected in the surroundings of that board.

Preferably, the content of the information message is generated by selecting the information message from a multiplicity of information messages. The multiplicity of information messages may be stored on a server of the VCE platform. The multiplicity of information messages may also be stored in the electronic display itself. In that case, the role of the VCE can comprise the distribution of these information messages in advance and to select or activate the presentation of one of them if the criteria of the message are met.

In another advantageous embodiment of the present invention the user profile is selected from a multiplicity of user profiles each associated to a terminal identifier whereas a the terminal identifier associated to the mobile communication terminal is compared with the terminal identifiers of the multiplicity of user profiles. The multiplicity of user profiles may be stored on a server of the VCE platform.

According to yet another preferred embodiment of the present invention, the content of the information message is generated in order to increase its relevance to the user. The relevance of the content of the information message is preferably determined by the number of correspondences between target categories associated to the content of the multiplicity of information messages and user categories associated to the user profile.

Preferebly the content of the information message is adapted to the type of electronic display selected for displaying the information message. The adaption of the content my be accomplished by the VCE. This means that the content of the information message is completely generated on the VCE platform. In this case the information message content would be transported from the VCE to the electronic display. Alternatively the electronic display may have the sole responsibilty for the adaption of the information message content.

The location of the mobile communication terminal may be determined in many different ways. In an advantageous embodiment of the present invention the location of the mobile communication terminal is determined by means of a location identifier associated to the mobile communication terminal, which comprises a coordinate identifier of a Global Positioning System (GPS) or a cell identifier of a cellular mobile communication system, particularly a cell identifier of a Global System for Mobile Communications (GSM). Especially the coordinate identifier of a GPS allows determination of the location with a very high resolution and accuracy. The cell identifier of a GSM or any other cellular telecommunication system may be realized with additional hardware requirements in any conventional cellular telecommunication system.

Advantageously the location of the mobile communication terminal is determined by means of the location identifier associated to a public electronic display, on which the information message generated is to be displayed to the user, the location identifier being transmitted from a data interface of the public electronic display to a corresponding data interface of the mobile communication terminal. Preferably the location signal is transmitted wirelessly by means of an infrared communication or a radio communication, particularly by means of a radio communication according to a Bluetooth standard.

According to this embodiment of the invention electronic billboard or bulletin boards are equipped with means for wirelessly transmitting a location signal comprising a location identifier representing the location of the boards to mobile communication terminals. The terminals are equipped with corresponding means for receiving the location signal. The location identifier is then transmitted from the terminal to a server of the VCE platform via a telecommunication network.

Finally, according to yet another preferred embodiment of the present invention, the generated information message is displayed to the user on a public or on a personal electronic display.

For a method as described above, the object of the present invention is solved in that the apparatus mentioned above further comprises:
  e) means for selecting an electronic display for providing the information message to the user according to the determined location of the user; and
  f) means for automatically transmitting the information message to the electronic display selected, whereas
  g) the means for determining the user profile receives a terminal identifier associated to the mobile communication terminal and/or the means for determining the location of the mobile communication terminal receives a location identifier from the mobile communication terminal.

Furthermore, if the electronic display is mobile (e.g. mounted on a zeppelin or on a public transport vehicle) the apparatus comprises means for determining the location of the electronic display.

In an advantageous embodiment of the present invention a multiplicity of user profiles related to various terminal identifiers associated to various mobile communication terminals is stored in the apparatus and that the means for determining the user profile compare the received terminal identifier with the terminal identifiers of the user profiles stored and select a user profile from the user profiles stored, which has a terminal identifier corresponding to the received terminal identifier.

According to another advantageous embodiment of the invention the user profiles contain preferred user categories comprising the user's interests.

In yet another advantageous embodiment of the invention a multiplicity of information messages is stored in the apparatus and that the means for generating the content of the information message select an information message from the information messages stored.

According to a preferred embodiment of the present invention preferred target categories are associated to the information messages stored, the target categories comprising preferred interests of users for which the information message is intended for, that user categories are associated to the user profiles stored, the user categories comprising the user's or the group of users' preferred interests, and that the means for generating the content of the information message determine the number of correspondences between the target categories and the user categories. The content of the information message may additionally be adapted to the type of mobile communication terminal.

According to another preferred embodiment of the invention, the location identifier comprises a coordinate identifier of a Global Positioning System (GPS) or a cell identifier of a cellular mobile communication system, particularly a cell identifier of a Global System for Mobile Communications (GSM).

Finally, according to yet another preferred embodiment of the invention, the information message generated includes advertisement or an offer of a service or product provider providing his service or product within the determined location of the mobile communication terminal.

BRIEF DESCRIPTION OF THE DRAWINGS

Further embodiments as well as further advantages of the present invention are outlined in the following description of the enclosed figures.

In FIG. 1 a bus 1 with a traveler is shown passing along in search of a place to stay for the night. The traveler is a user of the mobile communication terminal, i.e. a mobile phone 4. He is looking for a place which will cost him approximately US$ 10,— per night for bed and breakfast. A few kilometers further down the road there is a hotel 2 with an electronic billboard or bulletin board 3 in front of it. In the embodiment of FIG. 1 the billboard 3 is static but of course it may just as well be mobile (e.g. mounted on a zeppelin or on a public transport vehicle). The hotel has a standard room rate of US$ 40,— per night for bed and breakfast. However, a room rate of US$ 40,— is too expensive for the traveler and if such a room rate was announced on the billboard 3, the traveler would probably avoid the hotel 2 and continue his search for a cheaper place to stay.

Figure 1:
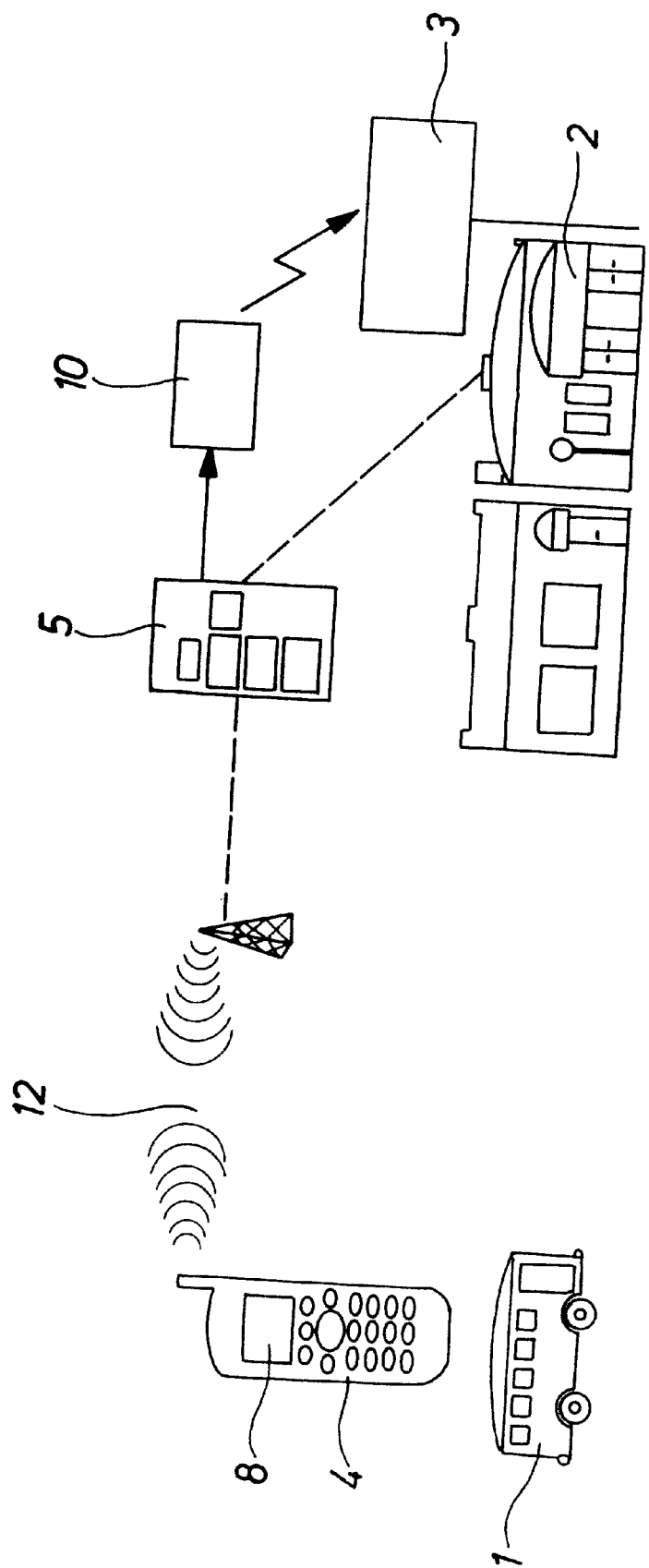
FIG. 1 shows a schematic view of a preferred embodiment of the apparatus according to the present invention.

Luckily the manager of the hotel 2 has a subscription for a Value Creation Environment (VCE). VCE is an environment wherein certain techniques, technologies and services are brought together in order to create a new service with more or added value to the various participants of the VCE. The participants are, for example, the traveler, an Individual Electronic Advertising service provider (IEA service provider), an advertiser 11, an owner of the VCE platform, an operator of a telecommunication network 12, in which the mobile phone 4 is integrated, and an owner of an electronic billboard or bulletin board 3. The hotel manager is the advertiser 11, who can use the services provided by VCE for a most efficient advertising strategy.

The VCE platform comprises a server 5, which automatically detects the presence of the mobile phone 4 within a predefined radius of the electronic billboard 3 (see step 20 in FIG. 3), i.e. the server 5 detects that the mobile phone 4 will reach the billboard 3 within a certain time. In the case of a mobile billboard step 20 would include detecting the presence of the billboard or determining the location of the billboard. The server 5 belongs to the operator of the telecommunication network 12. On the server 5 a multiplicity of user profiles 6 and terminal profiles 7 are stored (see FIG. 2). The user profiles 6 comprise preferred interests of various users. For example, the interests of the traveler currently looking for a place to stay may comprise his interest in hotel rooms for approximately US $10,—. Alternatively the interests comprise the traveler's income and additional information permitting to deduce the traveler's approximate upper price level for hotels. The user profile 6 is determined in step 21 of FIG. 3.

The actual location of various mobile phones within the telecommunication network 12 is stored in the terminal profiles 7. The location of the mobile phone 4 is stored in the terminal profile 7, which is associated with the mobile phone 4. The location of the mobile phone 4 may be determined by means of a location identifier, which is transmitted to the server 5 from the mobile phone 4 over the telecommunication network 12. A location identifier associated to the mobile phone 4 comprises a coordinate identifier of a Global Positioning System (GPS) associated to or incorporated in the mobile phone 4.

Alternatively the location identifier associated to the mobile phone 4 comprises a cell identifier of a cellular mobile phone like a Global System for Mobile Communications (GSM) or a Universal Mobile Telecommunications System (UMTS). The cell identifier is available in the server 5.

According to another embodiment of the invention (not shown in the figures) the electronic billboard or bulletin board 3 is equipped with means for wirelessly transmitting a location signal comprising a location identifier representing the location of the board 3 to the mobile phone 4. The phone 4 is equipped with corresponding means for receiving the location signal. The location signal preferably is transmitted via a infrared (e.g. Infrared Data Association (IrDA)-standard) or a radio network (e.g. Bluetooth-standard). The location identifier is then transmitted from the mobile phone 4 to the server 5 of the VCE platform via the telecommunication network 12.

Figure 3:
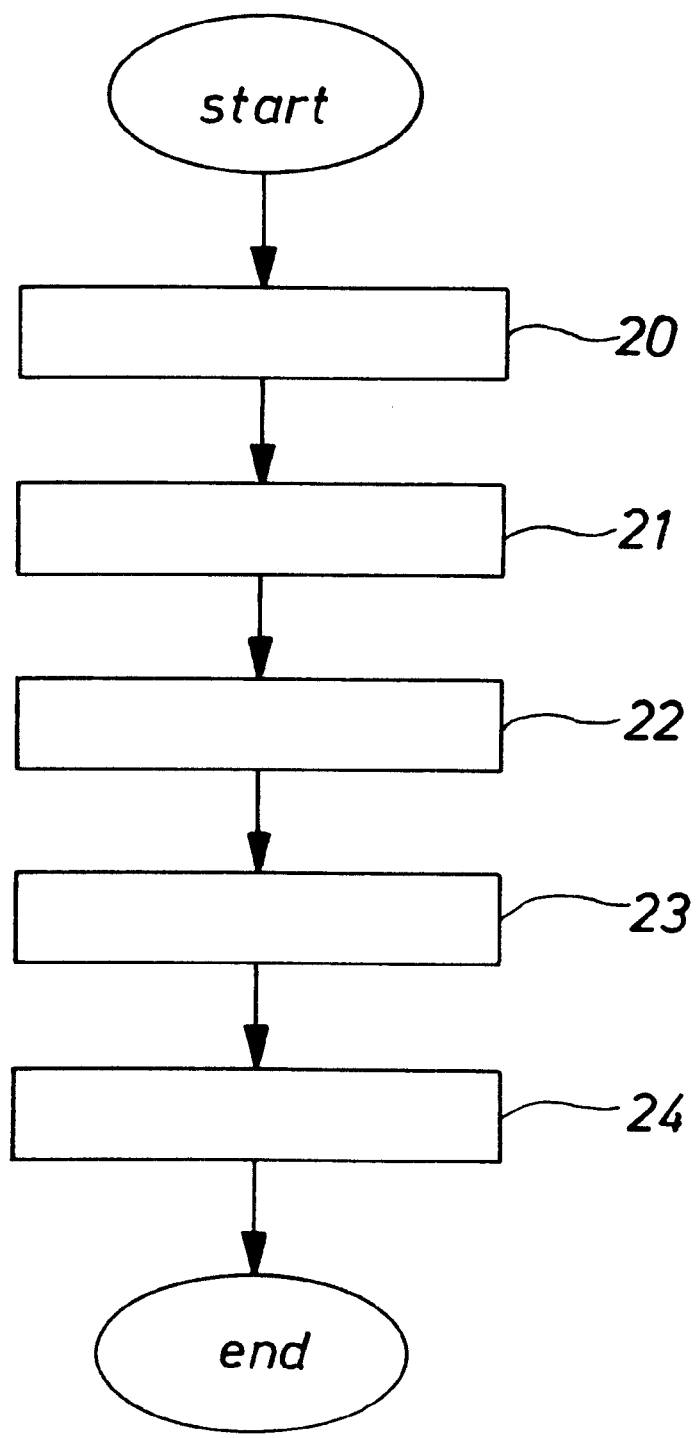
FIG. 3 shows another block diagram of the method according to FIG. 2.

Next the content of an information message to be presented to the traveler is generated (see step 22 in FIG. 3). This is performed in an IEA-server 9, which belongs to an IEA-service provider. For the purpose of generating the content of the information message, the information (location of the mobile phone 4) contained in the terminal profile 7 and the information (user's interests) contained in the user profile 6 are linked together in the IEA-server 9. The information message in the embodiment of FIG. 1 contains a special offer room rate of the hotel 2. Instead of the standard room rate of US$ 40,— the special offer is US$ 30,— per night. The information message generated is transmitted to transmitting means 10. Step 22 comprises applying for the strategy of the advertiser 11.

Then an electronic display is selected on which an information message is to be displayed in order to provide the content of the information message to an user (see step 23 in FIG. 3) by IEA-server 9. In the embodiment of FIG. 1 the electronic billboard 3 is selected. Of course, the information may just as well be displayed on a mobile display, e.g. the display 8 of the mobile phone 4, presupposing that the display 8 was selected in step 23 in FIG. 3 (see embodiment of FIG. 2). In that case step 23 would comprise determining the location of the mobile display. The message to be displayed is adapted to the type of electronic display.

The content of the information message can be dynamic on time provided by the advertiser 11. In this case, a communication session is set up or a fixed communication session is reused with a server of the advertiser 11 (see FIG. 2). This means that the decision on the content of the information message at that moment is exported back to the advertiser 11. The advertiser 11 returns back the content and the information message is presented on the selected displays 3, 8 by the apparatus 5.

Figure 2:
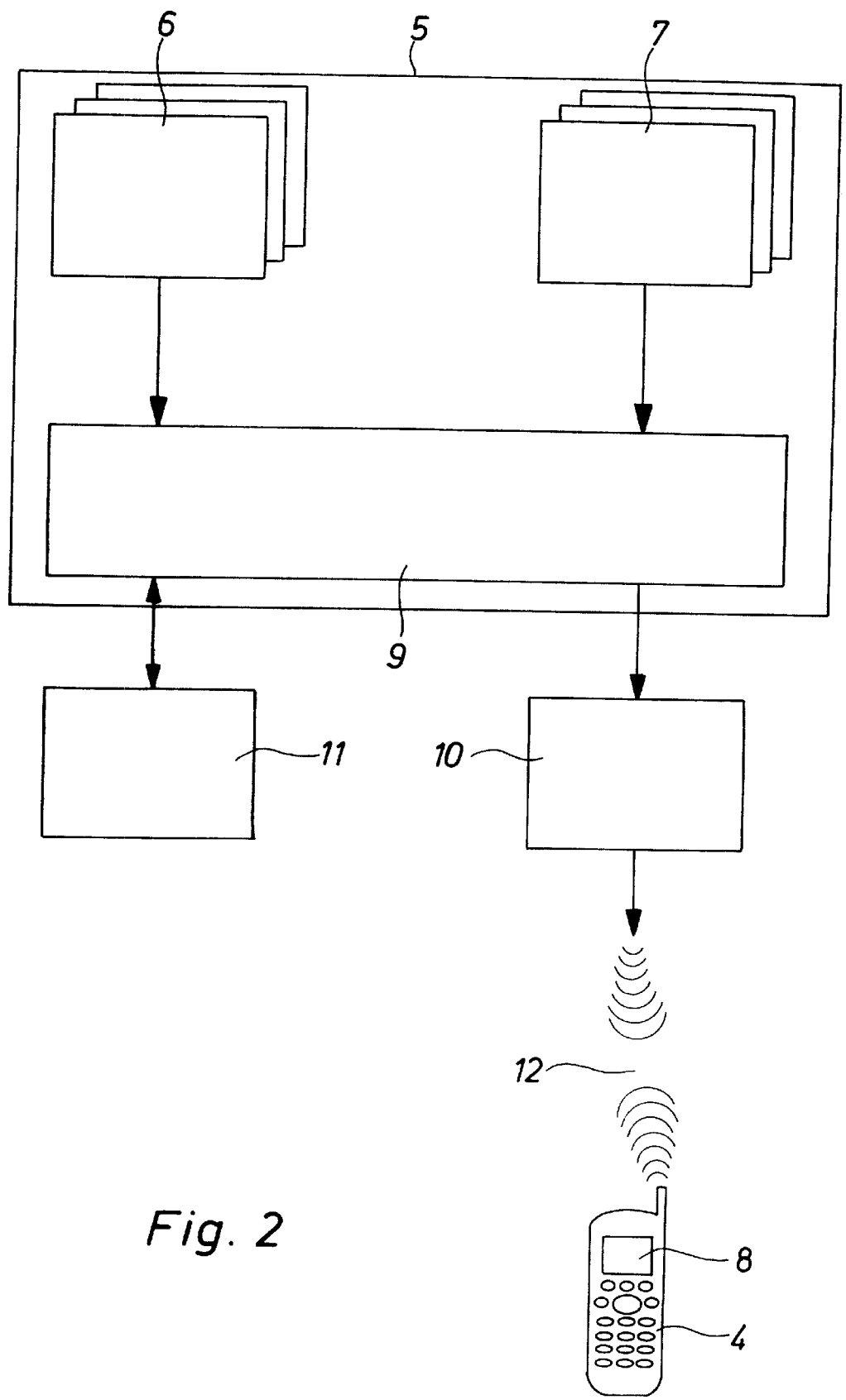
FIG. 2 shows a schematic block diagram of a preferred embodiment of the method according to the present invention.

The information message generated ("$30/Night+BB") is transmitted to the electronic display 3, 8 selected (see step 24 in FIG. 3). The transmission is performed by the transmitting means 10. The transmitting means 10 is a data interface of the hotel's display 3 to the VCE. In the embodiment of FIG. 1 the information generated is presented to the traveler on the billboard 3 selected. In the embodiment of FIG. 2 the information is presented to the traveler on the display 8 of his mobile phone 4 and the transmitting means 10 is an antenna of the telecommunications network 12.

Finally, for further explanation, determining the location of the mobile phone 4 and determining the user profile 6 by the IEA-server 9 is within the responsibility of the VCE. Generating the content of the information message by the IEA-server 9 is within the responsibility of the IEA service. Providing the information message to the user is within the responsibility of the VCE. Selecting the display 3, 8 for providing the information message to the user is within the responsibility of the IEA service. Transmitting the information message to the selected display 3, 8 can be within the responsibility of the VCE or the IEA service.

What is claimed is:

1. A method for providing a user of a mobile communication terminal or a group of users with a time-dependent information message, the method comprising:
    a) determining the location of the mobile communication terminal;
    b) determining a user profile of the user or the group of users;
    c) generating a content of the information message according to the determined user profile and according to the current time;
    d) providing the information message to the user or the group of users, without first generating a request message on behalf of the user or the group of users;
    e) selecting an electronic display for providing the information message to the user or the group of users according to the determined location of the user or the group of users; and f) automatically displaying the information message to the user or the group of users by means of the electronic display selected.

2. The method according to claim 1, wherein the content of the information message is generated according to the location of the mobile communication terminal.

3. The method according to claim 1, wherein the content of the information message is generated by selecting the information message from a multiplicity of information messages.

4. The method according to claim 1, wherein the user profile is selected from a multiplicity of user profiles each associated to a terminal identifier whereas the terminal identifier associated to the mobile communication terminal is compared with the terminal identifiers of the multiplicity of user profiles.

5. The method according to claim 3, wherein the content of the information message is generated to increase its relevance to the user or the group of users.

6. The method according to claim 5, wherein the relevance of the content of the information message is determined by the number of correspondences between target categories associated to the content of the multiplicity of information messages and user categories associated to the user profile.

7. The method according to claim 1, wherein the content of the information message is adapted to the type of electronic display selected for displaying the information message.

8. The method according to claim 1, wherein the location of the mobile communication terminal is determined by a location identifier associated to the mobile communication terminal, which comprises one of a coordinate identifier of a Global Positioning System (GPS) and a cell identifier of a cellular mobile communication system.

9. The method according claim 1, wherein the location of the mobile communication terminal is determined by a location identifier associated to a public electronic display, on which the information message generated is to be displayed to the user or the group of users, the location identifier being transmitted as a location signal from a data interface of the public electronic display to a corresponding data interface of the mobile communication terminal.

10. The method according to claim 9, wherein the location signal is transmitted wirelessly by one of an infrared communication and a radio communication.

11. The method according to claim 1, wherein the generated information message is displayed to the user or the group of users on one of a public electronic display and a personal electronic display.

12. The method according to claim 1,wherein the location of the mobile communication terminal is determined by a location identifier associated to the mobile communication terminal, and wherein the user profile is determined by a terminal identifier associated to the mobile communication terminal.

13. An apparatus for providing a user or a group of users of a mobile communication terminal with a time-dependent information message, comprising:

a) means for determining the location of the mobile communication terminal;

b) means for determining a user profile of the user or the group of users;

c) means for generating a content of the information message according to the determined user profile and according to the current time;

d) means for providing the information message to the user or the group of users, without first generating a request message on behalf of the user or the group of users;

e) means for selecting an electronic display for providing the information message to the user or the group of users according to the determined location of the user or the group of users; and f) means for automatically transmitting the information message to the electronic display selected, wherein at least either (1) the means for determining the user profile receives a terminal identifier associated to the mobile communication terminal or (2) the means for determining the location of the mobile communication terminal receives a location identifier associated to the mobile communication terminal.

14. The apparatus according to claim 13, wherein a multiplicity of user profiles related to various terminal identifiers associated to various mobile communication terminals is stored in the apparatus, and wherein the means for determining the user profile compares the received terminal identifier with the terminal identifiers of the user profiles stored and selects a user profile from the user profiles stored, which has a terminal identifier corresponding to the received terminal identifier.

15. The apparatus according to claim 13, wherein the user profiles contain preferred user categories comprising the user's or the group of users' interests.

16. The apparatus according to claim 13, wherein a multiplicity of information messages is stored in the apparatus, and wherein the means for generating the content of the information message selects an information message from the information messages stored.

17. The apparatus according to claim 16, wherein preferred target categories are associated to the information messages stored, the target categories comprising preferred interests of users for which the information message is intended, wherein user categories are associated to the user profiles stored, the user categories comprising the user's or the group of users' preferred interests, and wherein the means for generating the content of the information message determines the number of correspondences between the target categories and the user categories.

18. The apparatus according to claim 13, wherein the location identifier comprises one of a coordinate identifier of a Global Positioning System (GPS) and a cell identifier of a cellular mobile communication system.

19. The apparatus according to claim 13, wherein the information message generated includes one of advertisement, an offer of a service provided, and an offer of a product provider within the determined location of the mobile communication terminal.

* * * * *